US008942201B1

(12) United States Patent
Duvvuri et al.

(10) Patent No.: US 8,942,201 B1
(45) Date of Patent: Jan. 27, 2015

(54) BEACON FRAME SCHEDULING IN AN INDEPENDENT BASIC SERVICE SET NETWORK

(71) Applicant: QUALCOMM Incorporated, San Diego, CA (US)

(72) Inventors: Srinivasa Kumar Duvvuri, San Jose, CA (US); Sandip HomChaudhuri, San Jose, CA (US); BadriSrinivasan Sampathkumar, Cupertino, CA (US); Arunkumar Jayaraman, San Jose, CA (US); Ashish Kumar Shukla, Sunnyvale, CA (US); Rajkumar Rajkumar Samuel, San Jose, CA (US); James Simon Cho, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/227,874

(22) Filed: Mar. 27, 2014

Related U.S. Application Data

(60) Provisional application No. 61/887,854, filed on Oct. 7, 2013.

(51) Int. Cl.
*H04W 72/02* (2009.01)
*H04W 28/04* (2009.01)
(52) U.S. Cl.
CPC ............ *H04W 28/044* (2013.01); *H04W 72/02* (2013.01)
USPC .......................................... 370/329; 370/314
(58) Field of Classification Search
None
See application file for complete search history.

(56) References Cited

U.S. PATENT DOCUMENTS

| 7,412,265 | B2* | 8/2008 | Chen et al. ..................... 455/574 |
| 2003/0086437 | A1* | 5/2003 | Benveniste .................... 370/461 |
| 2004/0008661 | A1* | 1/2004 | Myles et al. .................. 370/350 |
| 2007/0133448 | A1* | 6/2007 | Gao et al. ...................... 370/311 |
| 2007/0140127 | A1* | 6/2007 | Frei .............................. 370/238 |
| 2008/0181154 | A1* | 7/2008 | Sherman ...................... 370/311 |
| 2012/0127902 | A1* | 5/2012 | Muqattash ................... 370/311 |
| 2013/0156016 | A1* | 6/2013 | Debnath et al. ............. 370/336 |
| 2013/0235720 | A1* | 9/2013 | Wang et al. ................. 370/229 |
| 2013/0235813 | A1* | 9/2013 | Segev et al. ................. 370/329 |
| 2013/0250832 | A1* | 9/2013 | Kim et al. .................... 370/311 |
| 2013/0272455 | A1* | 10/2013 | HomChaudhuri et al. ... 375/340 |

* cited by examiner

*Primary Examiner* — Anh-Vu Ly
*Assistant Examiner* — Hashim Bhatti
(74) *Attorney, Agent, or Firm* — Mahamedi Paradice LLP (57) ABSTRACT

A method and apparatus are disclosed for increasing the speed with which a number of stations associated with an IBSS network may be synchronized and/or for reducing the number of beacon frame collisions in the IBSS network. For at least some embodiments, the synchronization speed may be increased by allowing STAs having faster clock speeds to broadcast beacon frames more frequently than STAs having slower clock speeds.

12 Claims, 7 Drawing Sheets

BEACON FRAME SCHEDULING IN AN INDEPENDENT BASIC SERVICE SET NETWORK

CROSS-REFERENCE TO RELATED APPLICATION

This application claims the benefit under 35 USC 119(e) of the and commonly owned U.S. Provisional Application No. 61/887,854 entitled "INDEPENDENT BASIC SERVICE SET POWER SAVE" filed on Oct. 7, 2013, the entirety of which is incorporated by reference herein.

TECHNICAL FIELD

The present embodiments relate generally to wireless networks, and specifically to minimizing beacon frame collisions in an independent Basic Service Set wireless network.

BACKGROUND OF RELATED ART

A Wi-Fi network may be formed by one or more access points (APs) that provide a wireless communication channel or link with a number of client devices or stations (STAs). Each AP, which may correspond to a Basic Service Set (BSS), periodically broadcasts beacon frames to enable any STAs within wireless range of the AP to establish and/or maintain a communication link with the Wi-Fi network. The beacon frames, which may include a traffic indication map (TIM) indicating whether the AP has queued downlink data for the STAs, are typically broadcast according to a target beacon transmission time (TBTT) schedule.

An independent Basic Service Set (IBSS) network (also known as an ad-hoc wireless network or a peer-to-peer 802.11 wireless network) may be formed by a number of STAs without the presence of an AP. For an IBSS network, each STA belonging to the IBSS network may attempt to broadcast a beacon frame at each of the TBTTs. Because there is not an AP in an IBSS network, the beacon frame transmissions are distributed between the STAs in the IBSS network. Thus, at each TBTT, each STA associated with the IBSS network uses a backoff timer (e.g., a random number between 0 and twice the minimum contention window) to contend for medium access. The STA having the shortest backoff period wins the contention period for medium access, and may broadcast its beacon frame for the current TBTT interval. All other STAs receive the broadcasted beacon frame and terminate their contention for medium access for the current TBTT interval.

The broadcasted beacon frame includes the transmitting STA's timing synchronization function (TSF) value. The other STAs may synchronize their own local TSF values with the broadcasted TSF value if the broadcasted TSF value is greater than the local TSF value so that all the STAs are synchronized with each other. Timing synchronization is important, for example, so that all the STAs may wake-up and contend for medium access at the correct same times.

As mentioned above, STAs typically use a backoff timer when contending for medium access (e.g., to broadcast a beacon frame). The backoff timer values are random, and therefore may reduce the probability of beacon frame collisions resulting from multiple STAs attempting to broadcast beacon frames at the same time. However, because synchronization of TSF values between the STAs in an IBSS network is relatively slow (e.g., compared with a BSS network), and because there is not a global or "master" TSF value in the IBSS network (e.g., compared with the global TSF value maintained by an AP in a BSS network), it may be difficult to maintain synchronization of all the STAs' TSF values in the IBSS network. Discrepancies between the STAs' TSF values may lead to beacon frame collisions and/or to other timing related problems. These problems may be exacerbated when one of the STAs acts as a forwarding device in a multi-hop IBSS network, for example, because of difficulties in synchronizing multiple IBSS sub-networks across a forwarding device.

Thus, there is a need to improve timing synchronization between the STAs in an IBSS network, for example, to reduce the probability of beacon frame collisions.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

An IBSS (or ad-hoc) wireless network and method of operation are disclosed that may increase the speed with which a number of wireless STAs associated with the network may be synchronized with each other and/or that may reduce the probability of beacon frame collisions in the network. In accordance with the present embodiments, the wireless network includes a number of STAs that may communicate with each other without an access point. Because there is no access point associated with the IBSS network, the STAs are responsible for broadcasting beacon frames according to a number of scheduled target beacon transmission times (TBTTs). When a STA broadcasts a beacon frame, the STA includes its local timing synchronization function (TSF) value in the beacon frame. Other STAs receive the beacon frame, retrieve the broadcast TSF value from the beacon frame, and then synchronize their own local TSF values with the broadcast TSF value. For example, if the broadcast TSF value is greater than a receiving STA's local TSF value, then the receiving STA updates its local TSF value with the broadcast TSF value. Otherwise, the receiving STA does not update its local TSF value.

In accordance with the present embodiments, the speed with which the STAs in an IBSS network are synchronized with each other may be increased by allowing the faster STAs to broadcast beacon frames more frequently than the slower STAs. Current IEEE 802.11 standards provide that a STA is to update its local TSF value only when it is less than the broadcast TSF value received in a beacon frame. The percentage of STAs in an IBSS network that synchronize their local TSF values with each other during a given TBTT interval may thus be related (e.g., proportional) to the clock speed of the broadcasting STA relative to the clock speeds of the receiving STAs. Therefore, in accordance with some embodiments, the frequency with which a selected STA is to broadcast beacon frames may be based upon the clock speed of the selected STA relative to the clock speeds of the other (non-selected) STAs.

For example, in an IBSS wireless network including a plurality of target beacon transmission times, a selected one of a plurality of wireless STAs associated with the network may schedule beacon frame transmissions by generating a number N; receiving information indicative of a clock speed of at least one non-selected wireless STA; dynamically adjusting the value of N based at least in part on the received information; and attempting to broadcast a beacon frame every $N^{th}$ target beacon transmission time, wherein the adjusted value of N indicates a clock speed of the selected wireless STA relative to the clock speed of the at least one non-selected wireless STA. The selected STA may dynamically adjust the value of N by generating a local TSF value; comparing the local TSF value with the received TSF value; and selectively adjusting the value of N based at least in part on the comparing. The selected STA may decrease the value of N if the local TSF value is greater than or equal to the received TSF value, and may increase the value of N if the local TSF value is less than the received TSF value.

For at one embodiment, the selected STA may be configured or otherwise caused to broadcast beacon frames only on even-numbered TBTT intervals or only on odd-numbered TBTT intervals.

For other embodiments, the STAs may be assigned to groups and/or eligible to contend for medium access for selected TBTTs based at least in part on a hash value of their MAC addresses (or other STA identifying information). For other embodiments, the STA identifying information (e.g., hashed MAC addresses) may be used to stagger or otherwise schedule eligibility of the STAs of the IBSS network for medium access to broadcast beacon frames.

For still other embodiments, the probability of beacon frame collisions in the IBSS network may be reduced by scheduling subsequent beacon frame transmission attempts based at least in part on the order in which the STAs previously transmitted beacon frames. More specifically, for at least some embodiments, each contention window (CW) may be divided into a number of CW sub-groups, with each CW sub-group including a predetermined number of slots. Because lower sub-groups may indicate earlier beacon frame transmission slots and higher sub-groups may indicate later beacon frame transmission slots, STAs having lower CW sub-groups are more likely to win access to the medium for beacon frame transmissions than STAs having higher CW sub-groups.

The probability of beacon frame collisions may also be reduced by distributing responsibility for beacon frame transmissions through all the STAs in the IBSS network according to a round-robin transmission schedule indicated in the beacon frame transmissions.

BRIEF DESCRIPTION OF THE DRAWINGS

The present embodiments are illustrated by way of example and are not intended to be limited by the figures of the accompanying drawings. Like numbers reference like elements throughout the drawings and specification.

DETAILED DESCRIPTION

The present embodiments are described below in the context of Wi-Fi enabled devices for simplicity only. It is to be understood that the present embodiments are equally applicable for devices using signals of other various wireless standards or protocols. As used herein, the terms "wireless local area network (WLAN)" and "Wi-Fi" can include communications governed by the IEEE 802.11 standards, BLUETOOTH®, HiperLAN (a set of wireless standards, comparable to the IEEE 802.11 standards, used primarily in Europe), and other technologies used in wireless communications. Further, the terms "sleep state" and "power save state" refer to a low-power operating mode in which one or more components of a Wi-Fi device or station are deactivated (e.g., to prolong battery life), and thus the terms "sleep state" and "power save state" may be used interchangeably herein.

In addition, the term "broadcast TSF value" refers to a TSF value embedded within and/or received from a beacon frame, and the term "local TSF value" refers to an internal TSF value generated within a particular station. The term "broadcasting STA" refers to a STA that broadcasts a beacon frame during a given TBTT interval. The term "fast STA" refers to a STA having a relatively fast internal clock speed, and the term "slow STA" refers to a STA having a relatively slow internal clock speed.

In the following description, numerous specific details are set forth such as examples of specific components, circuits, and processes to provide a thorough understanding of the present disclosure. The term "coupled" as used herein means coupled directly to or coupled through one or more intervening components or circuits. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scope all embodiments defined by the appended claims.

Figure 1:
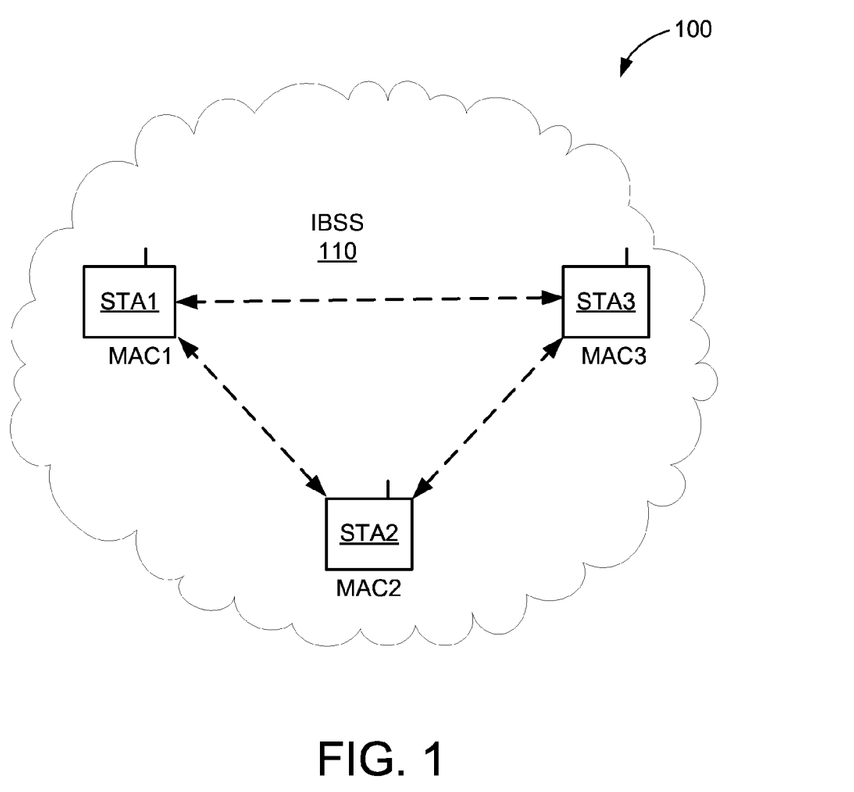
FIG. 1 depicts a network system within which the present embodiments may be implemented.

FIG. 1 depicts an example network system 100 within which the present embodiments may be implemented. The system 100 is shown to include three wireless stations STA1-STA3 that together form an Independent Basic Service Set (IBSS) network 110. Although only three stations STA1-STA3 are shown in FIG. 1 for simplicity, it is to be understood that the system 100 may include any number of STAs. Each of stations STA1-STA3 may be any suitable Wi-Fi enabled wireless device including, for example, a cell phone, PDA, tablet computer, laptop computer, or the like, and each of the stations STA1-STA3 may be assigned a unique MAC address (i.e., MAC1-MAC3, respectively) that is programmed therein by, for example, the manufacturer of the STA. Further, each of stations STA1-STA3 may include its own TSF timer (not shown for simplicity) that maintains a local TSF value for the STA. For some embodiments, the TSF timer may be a modulus $2^{64}$ counter that increments in micro-seconds, and thus has a maximum count value of $2^{64}=102,400$ micro-seconds (although other suitable timers, clocks, and/or counters may be used). Thus, for such embodiments, the TSF timer of each STA may provide a beacon interval of 102,400 micro-seconds.

Figure 2:
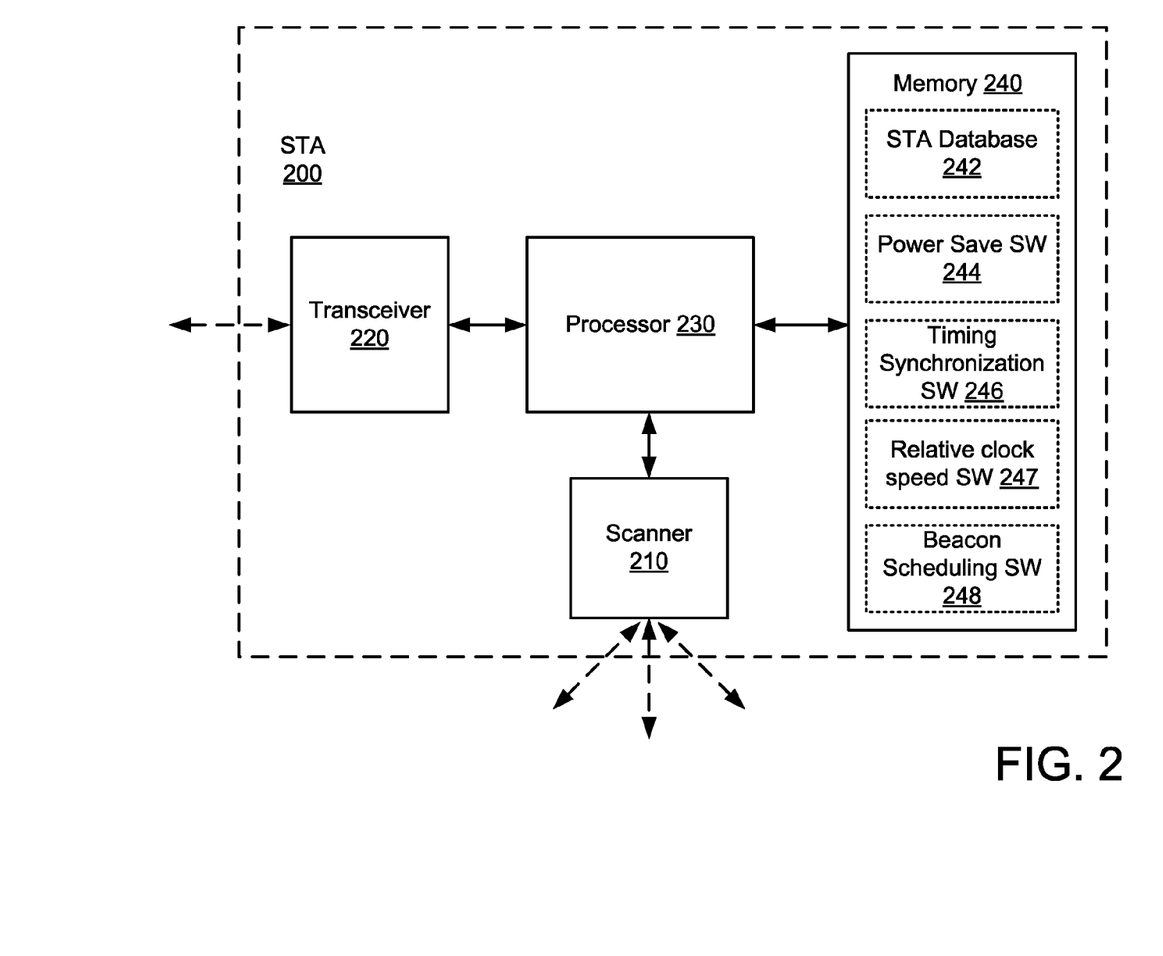
FIG. 2 shows a block diagram of a STA in accordance with some embodiments.

FIG. 2 shows a STA 200 that is one embodiment of the stations STA1-STA3 of FIG. 1. The STA 200 includes a scanner 210, a transceiver 220, a processor 230, and a memory 240. Scanner 210 may be used to scan the surrounding environment to detect and identify nearby APs and/or other STAs (e.g., when operating in a peer-to-peer mode). For some embodiments, the scanner 210 may search for nearby APs or STAs by listening for beacon frames. The transceiver 220 may be used to transmit signals to and receive signals from the APs and/or other STAs.

Memory 240 may include a STA database 242 that can be used as a local cache to store the media access control (MAC) addresses or other identifying information of a plurality of STAs (or APs), scheduled target beacon transmission times (TBTTs), supported data rates, and/or other suitable location or configuration information pertaining to the STAs (or APs). For some embodiments, each entry of the STA database 242 may include a name field to store the name of an associated STA (or AP), a basic service set identification (BSSID) field to store the MAC address of the associated STA (or AP), a beacon interval field to store the time duration between successive beacon frame transmissions, and/or a data rate field to store one or more supported data transmission rates of the associated STA.

Further, memory 240 may also include a non-transitory computer-readable storage medium (e.g., one or more non-volatile memory elements, such as EPROM, EEPROM, Flash memory, a hard drive, etc.) that may store the following software modules:

- a power save (PS) software module 244 to enter the STA 200 into the PS state and/or to periodically wake up the STA 200 from the PS state (e.g., to listen for beacon frames);
- a timing synchronization module 246 to selectively synchronize the local TSF value of STA 200 with a broadcast TSF value (e.g., received from a beacon frame);
- a relative clock speed module 247 to assign, generate, and/or dynamically adjust a number N indicative of the clock speed of the STA 200 relative to the clock speeds of one or more other STAs; and
- a beacon scheduling module 248 to selectively alter the beacon transmission schedule of the STA 200 based at least in part on the number N, based at least in part on a hash value of the STA 200's MAC address, based at least in part on assigned beacon slots, and/or based at least in part on other parameters (e.g., that may decrease the likelihood of beacon frame collisions in the IBSS network 110).

Each software module includes program instructions that, when executed by processor 230, may cause the STA 200 to perform the corresponding function(s). Thus, the non-transitory computer-readable storage medium of memory 240 may include instructions for performing all or a portion of the operations of FIGS. 4A, 4B, 5, 6, and/or 7.

Processor 230, which is coupled to scanner 210, transceiver 220, and memory 240, may be any suitable processor capable of executing scripts or instructions of one or more software programs stored in the STA 200 (e.g., within memory 240). Although not shown for simplicity, processor 230 may include one or more clocks that generate one or more clock signals for controlling various operations of processor 230 and/or STA 200. At least one of these clock signals may be used to generate the STA's local TSF value. For at least some embodiments, the STA may include a dedicated TSF timer (not shown for simplicity) to generate the STA's local TSF value.

Processor 230 may execute the PS software module 244 to enter the STA 200 into the PS state and/or to periodically wake up the STA 200 from the PS state (e.g., to listen for beacon frames and/or to transmit ATIM frames).

Processor 230 may execute the timing synchronization module 246 to selectively synchronize the STA's local TSF value with the broadcast TSF value (e.g., received from a beacon frame). For example, if the broadcast TSF value is greater than the STA's local TSF value, the timing synchronization module 246 may update the local TSF value; if the broadcast TSF value is not greater than the STA's local TSF value, the timing synchronization module 246 may not update the local TSF value with the broadcast TSF value.

Processor 230 may execute the relative clock speed module 247 to assign, generate, and/or dynamically adjust the value of a number N indicative of the clock speed of the STA 200 relative to the clock speeds of one or more other STAs. For some embodiments, processor 230 may include a compare circuit (or be configured) to dynamically adjust the value of N based at least in part on received information indicating the clock speed of one or more other STAs. In addition, processor 230 may include or be associated with a counter (not shown for simplicity) to maintain a "win count" value indicative of the number of TSF comparison operations for which the STA's local TSF value is greater than the broadcast TSF value received from a beacon frame, and/or processor 230 may include or be associated with a counter (not shown for simplicity) to maintain a "loss count" value indicative of the number of TSF comparison operations for which the STA's local TSF value is not greater than the broadcast TSF value received from a beacon frame.

Processor 230 may execute the beacon scheduling module 248 to selectively adjust the beacon transmission schedule of the STA 200 based at least in part on the number N, based at least in part on the win count value, based at least in part on a hash value of the STA's MAC address, based at least in part on assigned beacon slots, and/or based at least in part on other parameters.

Referring again to FIG. 1, for purposes of discussion herein, STA1 may be assumed to have created the IBSS network 110, and STA2-STA3 may be assumed to have subsequently joined the IBSS network 110. When STA1 creates the IBSS network 110, STA1 may broadcast a beacon frame that includes the MAC address of STA1, STA1's local TSF value, the operational parameters of STA1, the capabilities of STA1, and/or other information. The TSF value broadcast by STA1 may be used to establish a series of target beacon transmission times (TBTTs) that are spaced apart by the beacon interval. Thereafter, upon joining the IBSS network 110, each of the other stations STA2-STA3 may receive beacon frames broadcast from STA1, and may then synchronize their own local TSF values with the broadcast TSF value (i.e., $TSF_{STA1}$) received in the beacon frame. In this manner, the other stations STA2-STA3 may synchronize their own local TSF values with $TSF_{STA1}$, and thereafter derive the TBTT schedule for the IBSS network 110.

Power management in the IBSS network 110 may be based upon traffic indication messages. For example, once the stations STA1-STA3 are synchronized with each other, the stations STA1-STA3 may each enter a power save (PS) state and then periodically wake-up to listen for beacon frames at scheduled wake-up times (e.g., according to the TBTT schedule). Once awake, each of stations STA1-STA3 typically remains awake for a predetermined period of time commonly referred to as the announcement traffic indication message (ATIM) window.

The broadcast beacon frames may indicate the ATIM window for the IBSS network 110. The ATIM window may be defined as a predetermined period of time, commencing after transmission of the beacon frame, during which all stations STA1-STA3 are to be awake. During the ATIM window, each of the stations STA1-STA3 listens for ATIM frames transmitted from other STAs and/or may indicate the presence of buffered data units for one or more other STAs. For example, if a STA has unicast buffered data units for another STA in the IBSS network 110, the STA may transmit a directed ATIM frame to the other STA to indicate the presence of such unicast data units. Further, if a STA has multicast buffered data units for other STAs in the IBSS network 110, the STA may transmit a multicast ATIM frame to the other STAs to indicate the presence of such multicast data units.

Figure 3:
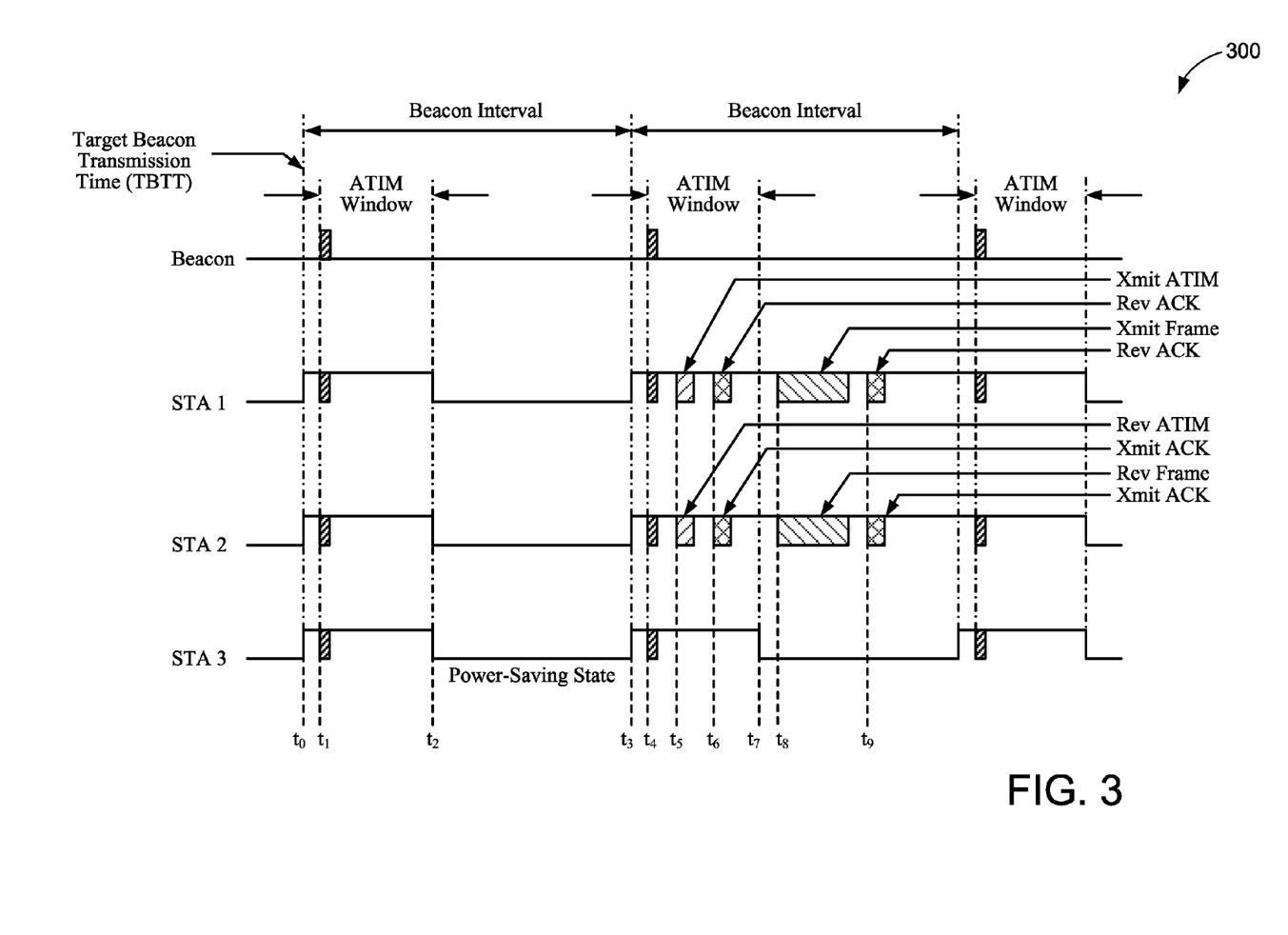
FIG. 3 shows an exemplary timing diagram illustrating the transmission of beacon frames and the exchange of data between the STAs of the wireless network of FIG. 1.

For example, FIG. 3 shows a timing diagram 300 illustrating the broadcast of beacon frames and the exchange of buffered unicast data between the stations STA1-STA3 in the IBSS network 110 of FIG. 1. The first TBTT occurs at time $t_0$. All stations STA1-STA3 wake up and contend for medium access (e.g., using their random backoff values) during the first contention window, which lasts from time $t_0$ to time $t_1$. By the end of the first contention window, one of the stations STA1-STA3 wins medium access and broadcasts a beacon frame. All stations STA1-STA3 receive the beacon frame just after time $t_1$, and remain awake during the first ATIM window, which lasts from time $t_1$ to time $t_2$. For the example of FIG. 3, none of stations STA1-STA3 broadcasts an ATIM frame during the first ATIM window, and therefore all stations STA1-STA3 may return to the PS state after the first ATIM window expires (at time $t_2$).

All stations STA1-STA3 wake-up from their PS states for the second TBTT at time $t_3$, and contend for medium access (e.g., using their random backoff values) during the second contention window, which lasts from time $t_3$ to time $t_4$. By the end of the second contention window, one of the stations STA1-STA3 wins medium access and broadcasts a beacon frame. All stations STA1-STA3 receive the beacon frame just after time $t_4$, and remain awake during the second ATIM window, which lasts from time $t_4$ to time $t_7$. For the example of FIG. 3, STA1 transmits a directed ATIM frame to STA2 at time $t_5$. The directed ATIM frame indicates that STA1 has data to be delivered to STA2. STA2 receives the directed ATIM frame, and sends an acknowledgement (ACK) frame to STA1 at time $t_6$. Stations STA1 and STA2 remain awake beyond the second ATIM window to exchange data indicated by the ATIM frame. Specifically, at time $t_s$, STA1 transmits a data frame to STA2, which in response thereto sends an ACK frame to STA1 at time $t_9$. Because the ATIM frame is not addressed to STA3, STA3 may return to the PS state after the second ATIM window, at time $t_7$.

The operation of power saving stations STA1-STA3, as described above with respect to FIG. 3, may depend upon stations STA1-STA3 remaining synchronized with each other. As mentioned above, stations STA1-STA3 may synchronize their TSF values with each other using broadcast TSF values included within beacon frames transmitted at the TBTTs. Further, at each TBTT, the stations STA1-STA3 may compete with each other (e.g., contend for medium access) to broadcast the beacon frame. To prevent multiple STAs from broadcasting beacon frames at the same time, each of the stations STA1-STA3 may select a random backoff value, for example, by setting their backoff timer to a random value between 0 and twice the minimum contention window. Then, at the beginning of the TBTT, each of the stations STA1-STA3 may count down from its selected backoff value. The first STA to reach a zero count value (or the STA that selected the earliest backoff slot) "wins" medium access, and may thereafter transmit its beacon frame for the current TBTT. Other STAs receive the beacon frame broadcast from the "winning" STA, determine that they "lost" medium access for the current TBTT, and therefore do not transmit their beacon frames for the current TBTT.

To synchronize the stations STA1-STA3 with each other, the winning STA may embed its local TSF value within the transmitted beacon frame, and each of the other STAs may selectively update or synchronize their own local TSF values with the broadcast TSF value indicated in the beacon frame. Per current IEEE 802.11 standards, if the broadcast TSF value (hereinafter denoted as $TSF_{BRCT}$) is greater than a receiving STA's local TSF value (hereinafter denoted as $TSF_{LOCAL}$), then the receiving STA updates its local TSF value with the broadcast TSF value. Conversely, if $TSF_{BRCT}$ is not greater than $TSF_{LOCAL}$, then the receiving STA does not update its local TSF value. Thus, at each TBTT, all STAs having local TSF values that are less than the TSF value broadcast in the beacon frame are updated with the broadcast TSF value.

Because each STA's local TSF value is typically based at least in part on (e.g., generated by) the STA's internal clock, differences between the STAs' internal clock speeds may result in variations between the STAs' local TSF values. More specifically, a first STA having a relatively fast clock speed (e.g., a "faster" STA) may generate a relatively high local TSF value, and a second STA having a relatively slow clock speed (e.g., a "slower" STA) may generate a relatively low local TSF value. Thus, because each STA updates its own local TSF value only if the broadcast TSF value is greater than its local TSF value, the local TSF values for stations STA1-STA3 in the IBSS network 110 may eventually be synchronized with the TSF value of the STA having the fastest internal clock speed.

The speed with which the local TSF values of stations STA1-STA3 are synchronized with the TSF value of the fastest STA may depend upon how often the slower STAs win medium access for broadcasting beacon frames at the TBTTs (e.g., as compared with how often the faster STAs win medium access for broadcasting beacon frames at the TBTTs). For example, when a STA having the slowest clock speed (e.g., the "slowest" STA) in an IBSS network broadcasts a beacon frame at a given TBTT, the corresponding broadcast TSF value is likely to be less than the local TSF values of all other STAs in the IBSS network, and therefore none of the other STAs may update their local TSF values during the corresponding TBTT interval. As a result, the local TSF values of the STAs may continue to drift further away from each other during the corresponding TBTT interval. Conversely, when a STA having the fastest clock speed (e.g., the "fastest" STA) in the IBSS network broadcasts a beacon frame at a given TBTT, the corresponding broadcast TSF value is likely to be greater than the local TSF values of all other STAs in the IBSS network, and therefore all of the other STAs may update their local TSF values during the corresponding TBTT interval. In this situation, all STAs in the IBSS network may be synchronized with the fastest STA in a single TBTT interval.

When the local TSF values of stations STA1-STA3 of the IBSS network 110 are not synchronized with each other, the stations STA1-STA3 may no longer wake-up at the same time to receive beacon frames and/or to transmit ATIM frames, which in turn may degrade performance of the IBSS network 110. In addition, as the stations STA1-STA3 become increasingly out-of-synch with each other, the probability of each of stations STA1-STA3 gaining medium access at the TBTTs may become less evenly distributed, which in turn may reduce the predictability of the speed with which the stations STA1-STA3 are synchronized with each other. Thus, it is desirable to increase the speed with which the STAs in an IBSS network are synchronized with each other and to maintain synchronization between the STAs for as long as possible.

In accordance with the present embodiments, the speed with which the STAs in an IBSS network (e.g., stations STA1-STA3 in the IBSS network 110) are synchronized with each other may be increased by allowing the faster STAs to broadcast beacon frames more frequently than the slower STAs. As mentioned above, because current IEEE 802.11 standards provide that a STA is to update its local TSF value only when it is less than the broadcast TSF value received in a beacon frame, the percentage of STAs in an IBSS network that synchronize their local TSF values with each other during a given TBTT interval may be related (e.g., proportional) to the clock speed of the broadcasting STA relative to the clock speeds of the receiving STAs. Therefore, in accordance with some embodiments, the frequency with which a selected STA is to broadcast beacon frames may be based upon the clock speed of the selected STA relative to the clock speeds of the other (non-selected) STAs.

Referring again to FIG. 1, each of stations STA1-STA3 in the IBSS network 110 may be assigned or otherwise associated with a number N that may indicate the relative clock speed of the station (e.g., as compared to the clock speeds of the other stations), wherein STAs having faster clock speeds may be assigned lower values of N and STAs having slower clock speeds may be assigned higher values of N. Thereafter, each of stations STA1-STA3 may attempt to transmit a beacon frame containing its local TSF value during every $N^{th}$ TBTT interval (e.g., rather than during every TBTT interval). In this manner, faster STAs may be eligible to broadcast their own TSF values in beacon frames more often than slower STAs, thereby increasing the likelihood that beacon frames broadcast within the IBSS network 110 include higher TSF values (e.g., as compared with conventional schemes that allow stations to contend for similar numbers or instances of beacon transmissions). In other words, by assigning eligibility for medium access contention based upon STA clock speeds, the present embodiments may ensure that faster STAs broadcast beacon frames more frequently than slower STAs, which in turn may increase the speed with which the stations STA1-STA3 are synchronized with each other.

In addition, because only a selected subset of the STAs may be eligible for broadcasting beacon frames during at least some of the TBTT intervals, the probability of beacon frame collisions may be reduced for such TBTT intervals (e.g., as compared to conventional networks in which all (or most) of the STAs may contend for medium access during successive TBTT intervals). For one example, if only STA1 is eligible to contend for medium access during a selected TBTT interval, then there is no possibility of beacon frame collisions for the selected TBTT interval. For another example, if only one-half of the STAs in a particular IBSS network are eligible to contend for medium access during a selected TBTT interval, then the possibility of beacon frame collisions for the selected TBTT interval is reduced by approximately one-half (as compared with a TBTT interval for which all STAs are eligible to contend for medium access).

Any suitable range of numbers may be allocated to the values of N associated with the stations STA1-STA3. For some embodiments, the maximum value of N may be derived from or otherwise based at least in part on the number of stations associated with the IBSS network. For other embodiments, the maximum value of N may be selected using other criteria, for example, based upon a maximum number of stations that may be able to join the IBSS network 110. For still other embodiments, the maximum value of N may be based at least in part on some other suitable parameters or criteria.

For one example, if STA1 has the fastest clock speed, STA2 has the next fastest clock speed, and STA3 has the slowest clock speed (and thus $TSF_{STA1} > TSF_{STA2} > TSF_{STA3}$), then STA1 may be assigned a value of $N_1=1$, STA2 may be assigned a value of $N_2=2$, and STA3 may be assigned a value of $N_3=3$. Accordingly, for this example, STA1 may attempt to broadcast beacon frames during every TBTT interval, STA2 may attempt to broadcast beacon frames during every $2^{nd}$ TBTT interval, and STA3 may attempt to broadcast beacon frames during every $3^{rd}$ TBTT interval. The eligibility of each station STA1-STA3 to contend for medium access to broadcast beacon frames during the first 6 scheduled TBTTs, for this example, is depicted below in Table 1.

TABLE 1

| station | $1^{st}$ TBTT | $2^{nd}$ TBTT | $3^{rd}$ TBTT | $4^{th}$ TBTT | $5^{th}$ TBTT | $6^{th}$ TBTT |
|---|---|---|---|---|---|---|
| STA1 | yes | yes | yes | yes | yes | yes |
| STA2 |  | yes |  | yes |  | yes |
| STA3 |  |  | yes |  |  | yes |

Thus, for the example described above and depicted in Table 1, STA1 is the only station eligible to contend for medium access during the $1^{st}$ TBTT interval. In this manner, only STA1 will broadcast the beacon frame during the $1^{st}$ TBTT interval (and every $6^{th}$ TBTT interval thereafter), thereby ensuring that the slower stations STA2 and STA3 synchronize their local TSF values with STA1's TSF value no less frequently than every $6^{th}$ TBTT interval (note that it is possible that STA1 wins medium access during other TBTT intervals for which STA2 and/or STA3 are eligible to contend for medium access). As depicted in Table 1, STA2 may contend for medium access during the $2^{nd}$, $4^{th}$ and $6^{th}$ TBTT intervals, and STA3 may contend for medium access during the $3^{rd}$ and $6^{th}$ TBTT intervals.

For at least one embodiment, the values of N assigned to the stations STA1-STA3 may not be equally spaced. For a second example, STA1 may be assigned a value of $N_1=1$, STA2 may be assigned a value of $N_2=3$, and STA3 may be assigned a value of $N_3=10$ (although other values of $N_1$–$N_3$ may be assigned to stations STA1-STA3). For at least another embodiment, multiple stations may be assigned the same value of N (e.g., $N_1=N_2$).

For some embodiments, once a given STA broadcasts the beacon frame, it may defer attempting to transmit beacon frames for N or more subsequent TBTT intervals. For at least one embodiment, the eligibility of the stations STA1-STA3 to contend for medium access may be altered or modified to ensure that each of stations STA1-STA3 broadcasts a beacon frame at least once every M TBTT intervals. For example, referring again to Table 1, if STA3 loses the contention for medium access during the $3^{rd}$ and $6^{th}$ TBTT intervals, then it may be desirable to allow STA3 to broadcast the beacon frame within a subsequent number of TBTT intervals, for example, so that no more than M>$N_3$ TBTT intervals pass before STA3 is selected to broadcast the beacon frame.

The values of $N_1$–$N_3$ for the stations STA1-STA3 may be generated, assigned, and/or determined in any suitable manner. For some embodiments, the values of $N_1$–$N_3$ for stations STA1-STA3 may be determined and/or assigned when the stations STA1-STA3 become associated with the IBSS network 110 (e.g., by comparing the clock speeds of stations STA1-STA3 with each other and assigning corresponding values of $N_1$–$N_3$ in response thereto). For other embodiments, the values of $N_1$–$N_3$ for stations STA1-STA3 may be generated internally and/or initialized to a predetermined value(s). Thereafter, the values of $N_1$–$N_3$ may be dynamically adjusted based upon subsequently received information indicative of the clock speeds of the other STAs. The subsequently received information may be based at least in part on or otherwise derived from each STA's comparisons between its local TSF value and broadcast TSF values received from beacon frames.

More specifically, for some embodiments, a selected one of stations STA1-STA3 may generate a corresponding value of N and/or initialize the value of N to a predetermined number. Then, the selected STA may receive a beacon frame broadcast from another STA during an initial TBTT interval, and selectively update its local TSF value based at least in part on a comparison between its local TSF value and the broadcast TSF value. As discussed above, a STA updates its local TSF value only if the broadcast TSF value ($TSF_{BRCT}$) is greater than its local TSF value ($TSF_{LOCAL}$). Thus, the selected STA may use the results of the comparison between $TSF_{BRCT}$ and $TSF_{LOCAL}$ to dynamically update its value of N. For some embodiments, the selected STA may decrease its value of N in response to winning a predetermined number of TSF value comparisons and/or a predetermined percentage of TSF value comparisons. Thereafter, the selected STA may continue to dynamically update its value of N based at least in part on any number of subsequent comparisons between $TSF_{BRCT}$ and $TSF_{LOCAL}$.

For example, using the example above in which STA1 has the fastest clock speed, STA2 has the next fastest clock speed, and STA3 has the slowest clock speed (e.g., and thus $TSF_{STA1}$>$TSF_{STA2}$>$TSF_{STA3}$), suppose that stations STA1-STA3 each initialize their values of N to 3 (i.e., $N_1$=$N_2$=$N_3$=3). Now suppose that STA1 broadcasts a beacon frame including $TSF_{STA1}$ as $TSF_{BRCT}$ during the $1^{st}$ TBTT interval. Because $TSF_{STA1}$>$TSF_{STA2}$>$TSF_{STA3}$, both STA2 and STA3 update their corresponding local TSF values ($TSF_{STA2}$ and $TSF_{STA3}$) with the broadcast TSF value ($TSF_{STA1}$). In response to these comparisons, neither STA2 nor STA3 may decrease their respective N values $N_2$ and $N_3$.

Now suppose that STA2 wins medium access for the $2^{nd}$ TBTT interval, and broadcasts a beacon frame including $TSF_{STA2}$ as $TSF_{BRCT}$. Due to the different clock speeds of stations STA1-STA3 discussed above, the TSF values of stations STA1-STA3 may be different from each other at the $2^{nd}$ TBTT. Thus, assume that $TSF_{STA1}$>$TSF_{STA2}$>$TSF_{STA3}$ by the $2^{nd}$ TBTT. Because $TSF_{STA2}$>$TSF_{STA3}$, STA3 updates its TSF value ($TSF_{STA3}$) with the broadcast TSF value ($TSF_{STA2}$), and does not decrease its value of $N_3$. However, because $TSF_{STA1}$>$TSF_{STA2}$, STA1 does not update its TSF value ($TSF_{STA1}$) with the broadcast TSF value, and may therefore decrease its value of $N_1$ (e.g., from 3 to 2) because $TSF_{STA1}$>$TSF_{STA2}$ (and is therefore presumed to have a faster clock than at least STA2).

Now suppose that STA3 wins medium access for the $3^{rd}$ TBTT, and broadcasts a beacon frame including $TSF_{STA3}$ as $TSF_{BRCT}$. Due to the different clock speeds of STA1-STA3 discussed above, the TSF values of stations STA1-STA3 may be different from each other at the $3^{rd}$ TBTT. Thus, assume that $TSF_{STA1}$>$TSF_{STA2}$>$TSF_{STA3}$ by the $3^{rd}$ TBTT. Because $TSF_{STA2}$>$TSF_{STA3}$, STA2 does not update its TSF value ($TSF_{STA2}$) with the broadcast TSF value ($TSF_{STA3}$), and may therefore decrease its value of $N_3$ (e.g., from 3 to 2) because $TSF_{STA2}$>$TSF_{STA3}$ (and is therefore presumed to have a faster clock than at least STA3). Similarly, because $TSF_{STA1}$>$TSF_{STA3}$, STA1 does not update its TSF value ($TSF_{STA1}$) with the broadcast TSF value ($TSF_{STA3}$), and may therefore decrease its value of $N_1$ (e.g., from 2 to 1) because $TSF_{STA1}$>$TSF_{STA3}$ (and is therefore presumed to have a faster clock than both STA2 and STA3). The operation of stations STA1 and STA2 dynamically updating their values of N for the above example is summarized below in Table 2.

TABLE 2

| station | initial value of N | N after $2^{nd}$ TBTT | N after $3^{rd}$ TBTT |
|---|---|---|---|
| STA1 | 3 | 2 | 1 |
| STA2 | 3 | 3 | 2 |
| STA3 | 3 | 3 | 3 |

Accordingly, for some embodiments, each STA may dynamically adjust (e.g., decrease) its value of N based at least in part on the number of times that the STA "wins" a comparison between its own local TSF value and the broadcast TSF value. For such embodiments, each STA may include a counter (e.g., included within or associated with memory 240 or processor 230 of FIG. 2) to track the number of TSF comparison wins for storage as a "win count" value. For at least one of such embodiments, each STA may also dynamically adjust (e.g., increase) its value of N based at least in part on the number of times that the STA "loses" a comparison between its own local TSF value and the broadcast TSF value.

For other embodiments, each STA may dynamically adjust its value of N based at least in part on a percentage of the TSF comparison wins and/or loses. For example, if a selected STA receives 10 beacon frames and updates its local TSF value 10 times (e.g., 100% of the time), then it is likely that the selected STA is one of the slower (if not the slowest) station in the IBSS network. Conversely, if the selected STA has not updated its local TSF value in response to any beacon frames (e.g., none of the time), then it is likely that the selected STA is one of the faster (if not the fastest) stations in the IBSS network.

Beacon frame collisions may be further reduced by allowing a first group (e.g., a first subset) of STAs to attempt to broadcast beacon frames only during odd-numbered TBTT intervals, and allowing a second group (e.g., a second subset) of STAs to attempt to broadcast beacon frames only during even-numbered TBTT intervals. For some embodiments, the stations STA1-STA3 of IBSS network 110 may be assigned to either the first group or the second group in a random manner. For other embodiments, the stations STA1-STA3 may be assigned to either the first group or the second group based at least in part on their values of N and/or based at least in part on their win count value. For example, in one such other embodiment, if a STA's win count value is less than a predetermined count threshold (e.g., which may indicate that the STA is relatively slow), then the STA may assign itself to the first group (or second group). Conversely, if a STA's win count value is greater than or equal to the predetermined count threshold (e.g., which may indicate that the STA is relatively fast), then the STA may assign itself to the second group (or first group).

Figure 4A:
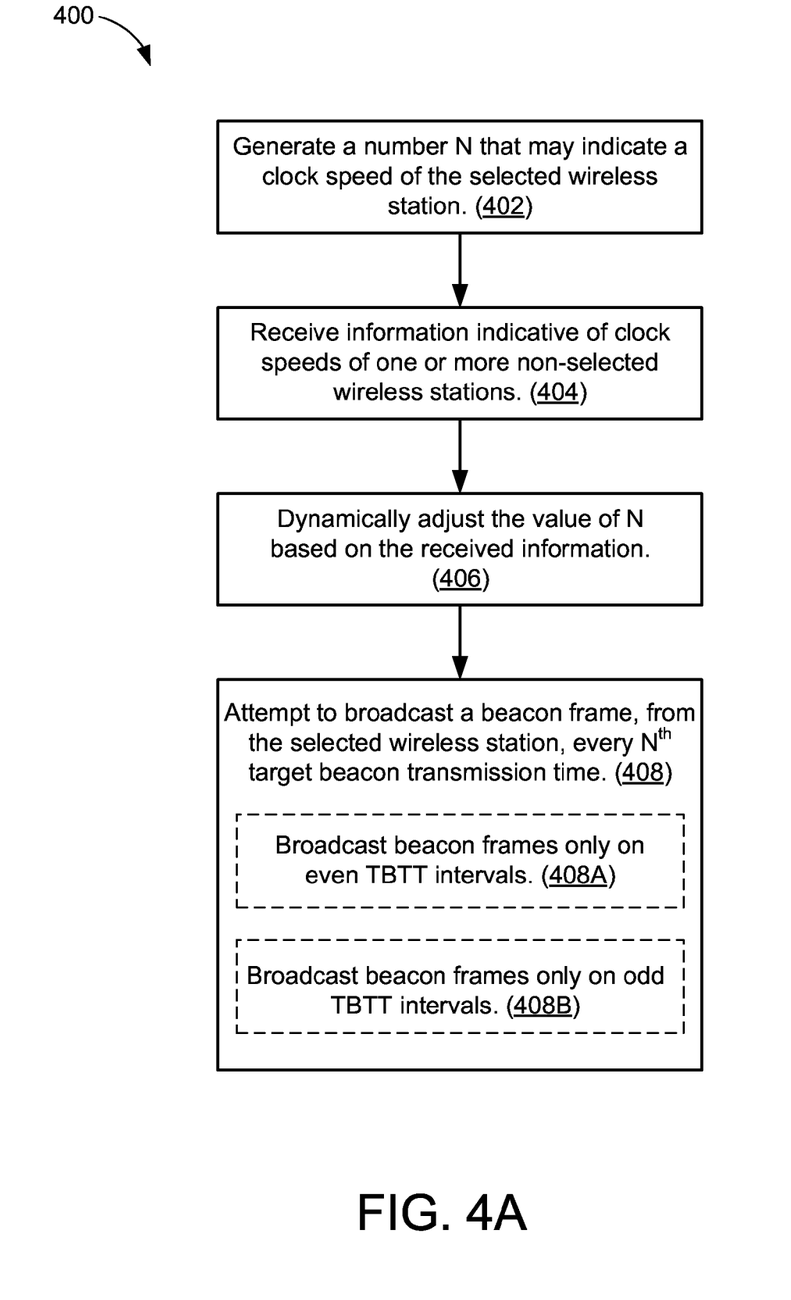
FIG. 4A shows an illustrative flow chart depicting an exemplary operation for determining which TBTTs that a selected STA may attempt to broadcast a beacon frame, in accordance with some embodiments.

FIG. 4A shows an illustrative flow chart depicting an exemplary operation 400 for determining which TBTTs that a selected STA may attempt to broadcast a beacon frame, in accordance with some embodiments. Referring also to FIG. 1, the selected STA first generates a value for the number N (402). The value of N, which may indicate the relative clock speed of the selected STA, may be initialized to a predetermined value or to a random value. For other embodiments, the value of N may be determined using other suitable techniques.

Next, the selected STA receives information indicative of clock speeds of one or more other (non-selected) STAs (404). As described above, for some embodiments, the information may correspond to broadcast TSF values embedded in beacon frames transmitted from other STAs. For other embodiments, one or more other STAs may transmit their local TSF values or other information indicative of their internal clock speed to the selected STA (e.g., in frames other than beacon frames).

Then, the selected STA may dynamically adjust the value of N based at least in part on the received information (406). As described above, the selected STA may compare its local TSF value with the broadcast TSF value upon receiving a beacon frame, and then use the comparison results to determine whether the selected STA's clock is faster or slower than the other STA's clock. For some embodiments, the selected STA may decrease its value of N if the selected STA is determined to be "faster" than the other STA, and may increase its value of N if the selected STA is determined to be "slower" than the other STA. Thus, the adjusted value of N may be indicative of the clock speed of the selected STA relative to the clock speeds of the other (non-selected) STAs.

Thereafter, the selected STA may attempt to broadcast a beacon frame every $N^{th}$ TBTT (408). Thus, rather than contending for medium access at every TBTT, the selected STA may contend for medium access at every $N^{th}$ TBTT. Reducing the number of STAs that contend for medium access for a given TBTT may reduce the probability of beacon frame collisions for the given TBTT. Further, for at least some embodiments, the faster STAs may be associated with lower values of N, and the slower STAs may be associated with higher values of N. In this manner, the faster STAs may be eligible to contend for medium access (e.g., to broadcast beacon frames) more often than the slower STAs, which as described above may increase the speed with which the STAs in the IBSS network 110 are synchronized with each other.

Further, for some embodiments, the selected STA may be configured or otherwise caused to broadcast beacon frames only on even-numbered TBTT intervals (408A) or only on odd-numbered TBTT intervals (408B). As described above, the STAs in IBSS network 110 may be assigned to different groups, for example, such that STAs assigned to a first group are to contend for medium access only on even-numbered TBTT intervals and STAs assigned to a second group are to contend for medium access only on odd-numbered TBTT intervals.

Figure 4B:
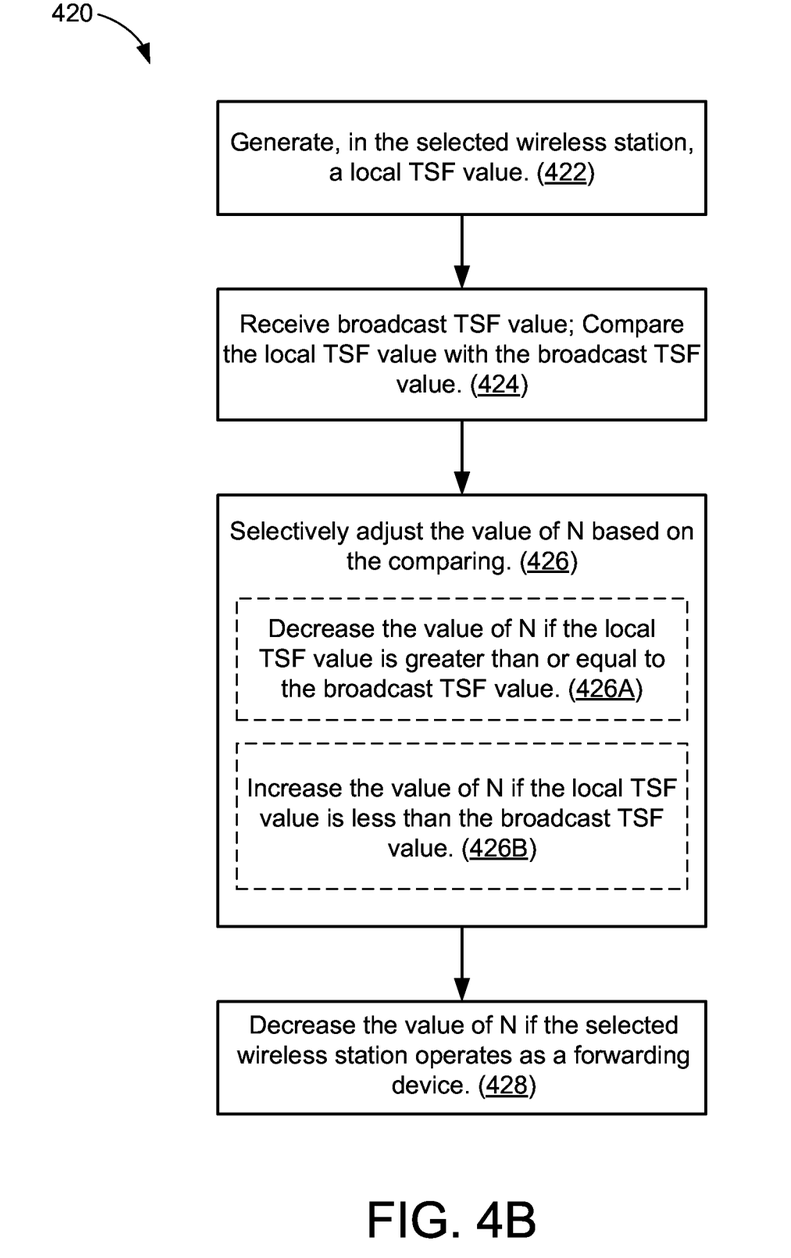
FIG. 4B shows an illustrative flow chart depicting an exemplary operation for dynamically adjusting a number N indicating the clock speed of the selected STA relative to one or more other STAs, in accordance with some embodiments.

FIG. 4B shows an illustrative flow chart depicting an exemplary operation 420 for dynamically adjusting the value of N in accordance with some embodiments. First, the selected STA generates a local TSF value (422). Next, after receiving a beacon frame including a broadcast TSF value, the selected STA compares its local TSF value with the broadcast TSF value (424). Then, the selected STA selectively adjusts the value of N based at least in part on the comparison between the local TSF value and the broadcast TSF value (426). More specifically, for some embodiments, the selected STA may decrease the value of N if its local TSF value is greater than or equal to the received broadcast TSF value (426A), and/or the selected STA may increase the value of N if its local TSF value is less than the received broadcast TSF value (426B). In this manner, the resulting adjusted values of $N_1-N_n$ for respective stations STA1-STAn may indicate the relative clock speeds of the stations STA1-STAn.

The embodiments described above with respect to FIGS. 4A-4B may also be employed in STAs that operate as forwarding devices between two different sections of an IBSS network. More specifically, TSF synchronization problems in IBSS networks may be exacerbated when two IBSS sub-networks are coupled together by a STA acting as a forwarding device. In accordance with the present embodiments, TSF synchronization speeds may be increased across different IBSS sub-networks by configuring the forwarding device to operate as the fastest STA in both IBSS sub-networks. In this manner, all STAs in both IBSS sub-networks may synchronize their local TSF values with the TSF value of the forwarding device. Thus, referring again to FIG. 4B, for some embodiments, if the selected STA operates as a forwarding device (e.g., that may interconnect two IBSS sub-networks), then the selected STA may decrease its value of N (428).

Referring again to FIG. 1, the stations STA1-STA3 of the IBSS network 110 may be assigned to groups and/or eligible to contend for medium access for selected TBTTs based at least in part on a hash value of their MAC addresses (or other STA identifying information). For example, the MAC address of a selected STA may be hashed to generate a hash value that is within a known range (e.g., 0 to 1). If the resulting hash value is above a threshold (e.g., above 0.5), then the selected STA may be assigned to a first group of STAs that are eligible to contend for medium access only during a first subset of TBTT intervals. If the resulting hash value is not above the threshold, the selected STA may be assigned to a second group of STAs that are eligible to contend for medium access only during a second subset of TBTT intervals. It should be noted that more than two groups of STAs and two subsets of TBTT intervals may be used in accordance with the present embodiments.

For other embodiments, the STA identifying information (e.g., hashed MAC addresses) may be used to stagger or otherwise schedule eligibility of the stations STA1-STA3 of IBSS network 110 for medium access to broadcast beacon frames. For example, each STA may hash its own MAC address (or other suitable STA identifying information) to generate a hash value. The hash values of the STAs may be unique from one another. Then, the STAs' hash values may be used as scheduling values to stagger beacon frame transmission attempts in the IBSS network 110. For one example, in an IBSS network including a number (X) of STAs, X beacon frame transmission slots may be defined and assigned to the STAs according to their generated hash values (e.g., where the first slot is assigned to the STA having the lowest hash value, and the last slot is assigned to the STA having the highest hash value). For another example, in an IBSS network including X STAs, a number Y>X beacon frame transmission slots may be defined and assigned to the STAs according to their generated hash values and then weighted according to their relative clock speeds (e.g., where faster STAs may be assigned more frequent transmission slots than slower STAs). Once the transmission slots are assigned to the STAs (e.g., according to their hash values), the STAs may alternately transmit beacon frames in a round robin manner.

Figure 5:
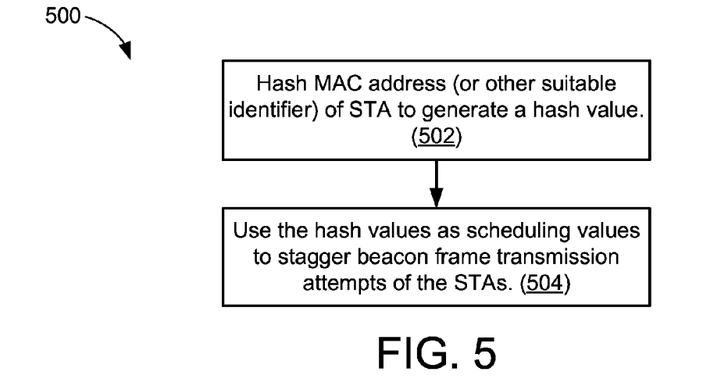
FIG. 5 shows an illustrative flow chart depicting an exemplary operation for staggering beacon frame transmissions based at least in part on identifiers assigned to the STAs, in accordance with some embodiments.

FIG. 5 shows an illustrative flow chart depicting an exemplary operation 500 for staggering beacon frame transmissions according to hashed MAC addresses of the STAs, in accordance with some embodiments. First, each STA may hash its own MAC address (or other suitable STA identifying information) to generate a hash value (502). Then, the STAs may use their hash values as scheduling values to stagger beacon frame transmission attempts in the IBSS network 110 (504). As described above, staggering eligibility for contending for medium access may reduce or even eliminate beacon frame collisions.

For still other embodiments, the probability of beacon frame collisions in the IBSS network 110 may be reduced by scheduling subsequent beacon frame transmission attempts based at least in part on the order in which the STAs previously transmitted beacon frames. More specifically, for at least some embodiments, each contention window (CW) may be divided into a number of CW sub-groups, with each CW sub-group including a predetermined number of slots. Because lower sub-groups may indicate earlier beacon frame transmission slots and higher sub-groups may indicate later beacon frame transmission slots, STAs having lower CW sub-groups are more likely to win access to the medium for beacon frame transmissions than STAs having higher CW sub-groups.

For some embodiments, the number of CW sub-groups may denote the number of STAs in the IBSS network 110. For example, if there are 32 STAs in the IBSS network 110, then the CW may be divided into 32 sub-groups each including 16 slots for a total of 32*16=512 slots in the CW. It should be noted that the number of sub-groups need not equal the number of STAs, and the number of slots in a sub-group is not limited to 16, as the number of sub-groups and/or the number of slots per sub-group may be any number greater than 1.

In operation, each STA in the IBSS network 110 may initially select the lowest CW sub-group for medium access to transmit beacon frames (e.g., all STAs may initially select the $1^{st}$ CW sub-group). For a first TBTT, all the STAs may randomly select one of the slots in the $1^{st}$ CW sub-group, and the STA that selects the lowest or earliest slot in the $1^{st}$ CW sub-group may transmit its beacon frame at the $1^{st}$ TBTT. The winning STA may then select the highest CW sub-group (e.g., the $32^{nd}$ sub-group) while all other STAs remain in the lowest CW sub-group.

Then, for the second TBTT, all of the previously losing STAs may randomly select one of the slots in the $1^{st}$ CW sub-group, and the STA that selects the lowest or earliest slot in the $1^{st}$ CW sub-group may transmit its beacon frame at the $2^{nd}$ TBTT. The winning STA may then select the highest CW sub-group (e.g., the $32^{nd}$ CW sub-group), the previous winning STA may move to the next-highest CW sub-group (e.g., the $31^{st}$ CW sub-group), and the other STAs remain in the lowest CW sub-group (e.g., the $1^{st}$ CW sub-group).

For some embodiments, every losing STA may decrement its CW sub-group by 1 if the CW sub-group is greater than 1. Over time, this may force STAs to select a different subgroup at any given TBTT.

This process repeats until all the STAs have selected different CW sub-groups. Over time, the STAs may establish a schedule for beacon frame transmissions (e.g., based upon the order in which the STAs transmitted their first beacon frames), which in turn may eliminate beacon frame collisions. In other words, by configuring the STAs to transmit their beacon frames according to a first-in first-out (FIFO) ordering mechanism, beacon frame collisions may be eliminated by having only one STA attempt to transmit its beacon frame during any given TBTT interval.

It is noted that when a STA leaves the IBSS network 110, the beacon frame transmission schedule may be updated. For at least some embodiments, the IBSS network 110 may be associated with a first CW sub-group (e.g., including slots 0-31) and a second CW sub-group (e.g., including slots 32-63). Initially, each STA may be assigned a corresponding slot in the first CW sub-group and, as a back-up, also assigned a slot in the second CW sub-group. In this manner, if a particular STA leaves the IBSS network 110 and therefore does not broadcast its beacon frame at a selected TBTT, another of the STAs may instead transmit its beacon frame at the selected TBTT.

Figure 6:
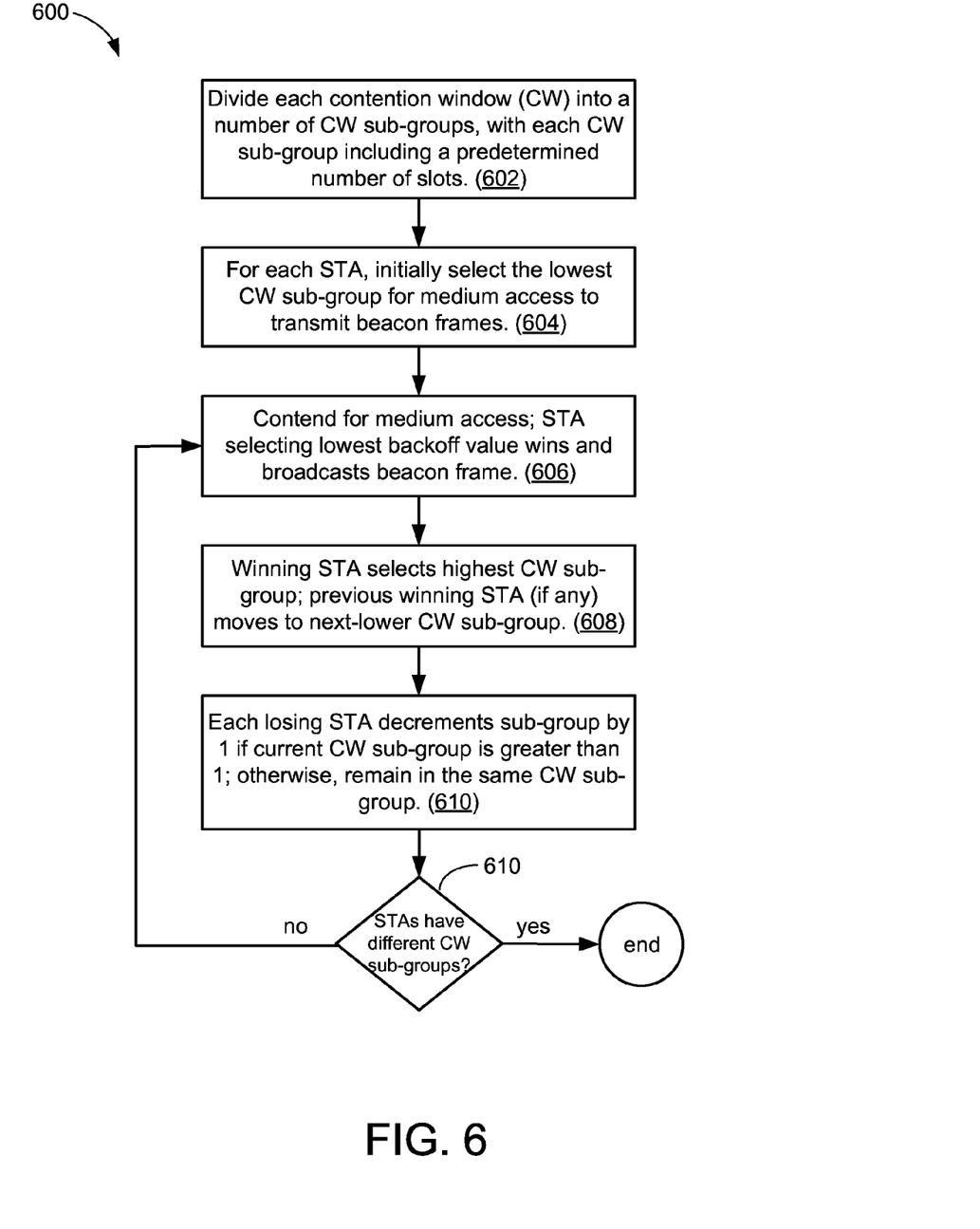
FIG. 6 shows an illustrative flow chart depicting an exemplary operation for selecting a beacon frame transmission schedule based at least in part on an order of first beacon frame transmissions, in accordance with some embodiments.

FIG. 6 shows an illustrative flow chart depicting an exemplary operation 600 for distributing responsibility for beacon frame transmissions through all the STAs in the IBSS network 110 according to a transmission schedule based at least in part on the order in which the STAs transmit their first beacon frames in the IBSS network 110. First, each contention window (CW) may be divided into a number of CW sub-groups, with each CW sub-group including a predetermined number of slots (602). Then, each STA may initially select or be assigned to the lowest CW sub-group to contend for medium access to transmit beacon frames (604). The STAs contend for medium access, and the STA that selects the lowest backoff value wins and broadcasts its beacon frame (606). The winning STA may then select or be re-assigned to the highest CW sub-group (e.g., the $32^{nd}$ sub-group), and the previous winning STA (if any) may select or be re-assigned to the next-lowest CW sub-group (608). For some embodiments, every losing STA may decrement its CW sub-group by 1 if the CW sub-group is greater than 1; otherwise, the losing STA remains in the same CW sub-group (610). Over time, this may force STAs to select a different CW sub-group at any given TBTT. Then, if the STAs have different CW sub-groups, as tested at 612, processing ends. Otherwise, if the STAs do not have different CW sub-groups, as tested at 612, processing continues at 606. This process repeats until all the STAs have selected or been re-assigned to different CW sub-groups (as depicted in FIG. 6). Over time, the STAs may establish a schedule for beacon frame transmissions (e.g., based upon the order in which the STAs transmitted their first beacon frames), which in turn may eliminate beacon frame collisions.

The probability of beacon frame collisions may also be reduced by distributing responsibility for beacon frame transmissions through all the STAs in the IBSS network according to a round-robin transmission schedule indicated in the beacon frame transmissions. More specifically, because every STA in the IBSS network 110 is aware of the MAC addresses of all other STAs in the IBSS network 110, when a STA transmits a beacon frame, the STA may include the MAC address of another STA that is to transmit its beacon frame at the next TBTT. In response thereto, the STA identified in the beacon frame may transmit its beacon frame at the next TBTT, and include the MAC address of the next STA that is to transmit its beacon frame at a subsequent TBTT. In this manner, only one STA may attempt to transmit its beacon frame at any given TBTT.

Figure 7:
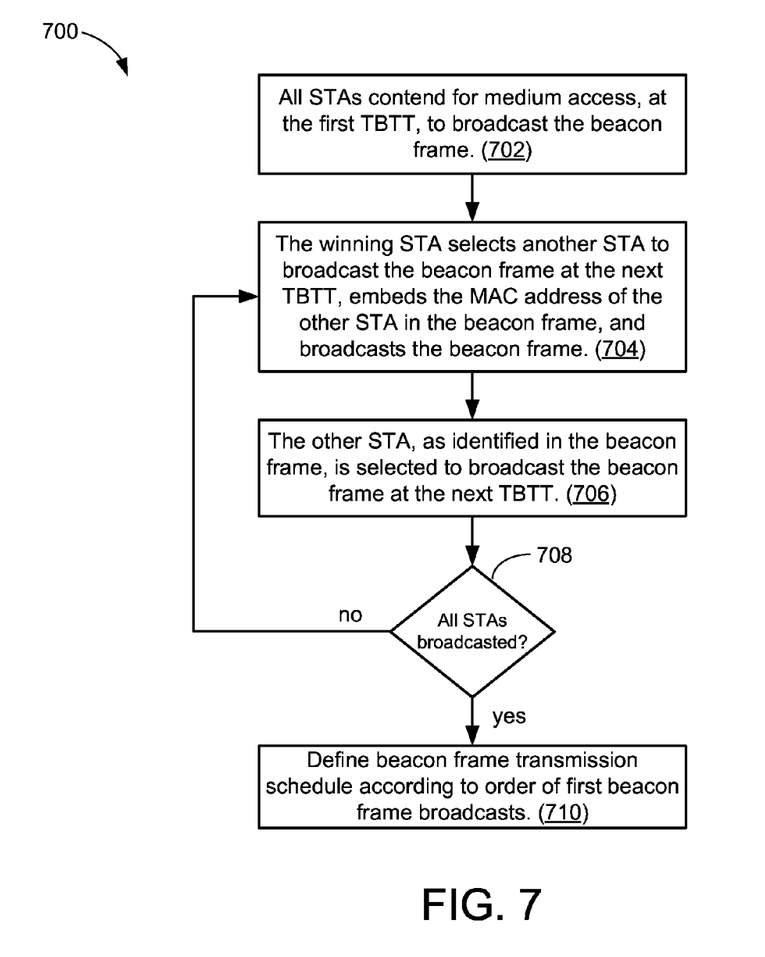
FIG. 7 shows an illustrative flow chart depicting an exemplary operation for distributing responsibility for beacon frame transmissions through all the STAs based at least in part on a round-robin transmission schedule indicated in the beacon frame transmissions.

FIG. 7 shows an illustrative flow chart depicting an exemplary operation 700 for distributing responsibility for beacon frame transmissions through all the STAs in the IBSS network 110 according to a round-robin transmission schedule indicated in the beacon frame transmissions. For example, at the first TBTT, all the STAs in the IBSS network 110 contend for medium access to broadcast the beacon frame (702). The winning STA selects another STA to broadcast the beacon frame at the next TBTT, embeds the MAC address of the other STA in the beacon frame, and broadcasts the beacon frame (704). The other STA, as identified in the beacon frame, is selected to broadcast the beacon frame at the next TBTT (706). This process continues until all the STAs have broadcasted one beacon frame. More specifically, if all the STAs have broadcasted their first beacon frame, as tested at 708, then the beacon frame transmission schedule may be defined according to the order in which the STAs broadcasted their first beacon frames (710). Otherwise, processing continues at 704.

In the foregoing specification, the present embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of scheduling beacon frame transmissions from a selected one of a plurality of wireless stations associated with an ad-hoc wireless network including a plurality of target beacon transmission times, the method comprising:
   receiving, at the selected wireless station, a timing synchronization function (TSF) value for at least one non-selected wireless station;
   dynamically adjusting the value of a natural number N that indicates a clock speed of the selected wireless station relative to a clock speed of the at least one non-selected wireless station by:
      generating, in the selected wireless station, a local TSF value;
      comparing the local TSF value with the received TSF value; and
      selectively adjusting the value of N based at least in part on the comparing; and
   contending for access to a wireless medium associated with the ad-hoc wireless network to attempt to broadcast a beacon frame, from the selected wireless station, only at every $N^{th}$ target beacon transmission time, wherein the value of N is independent of a target beacon transmission time interval.

2. The method of claim 1, wherein at least two of the wireless stations have different values of N.

3. The method of claim 1, wherein the selectively adjusting comprises:
   decreasing the value of N if the local TSF value is greater than or equal to the received TSF value; and
   increasing the value of N if the local TSF value is less than the received TSF value.

4. The method of claim 1, wherein:
   decreasing the value of N indicates a clock speed of the selected wireless station is faster than the clock speed of the at least one non-selected wireless station; and
   increasing the value of N indicates the clock speed of the selected wireless station is slower than the clock speed of the at least one non-selected wireless station.

5. The method of claim 1, further comprising:
   decreasing the value of N if the selected wireless station operates as a forwarding node.

6. The method of claim 1, further comprising:
   dividing a contention window into a number of sub-windows;
   assigning the selected wireless station to a random one of the sub-windows; and
   for each target beacon transmission time:
      re-assigning the selected wireless station to a last of the sub-windows if the selected wireless station transmits the beacon frame; and
      re-assigning the selected wireless station to an adjacent lower sub-window if the selected wireless station does not transmit the beacon frame.

7. A selected wireless station associated with an ad-hoc wireless network including a plurality of target beacon transmission times, the selected wireless station comprising:
   a transceiver to receive a timing synchronization function (TSF) value for at least one non-selected wireless station;
   a processor to dynamically adjust the value of a natural number N that indicates a clock speed of the selected wireless station relative to a clock speed of the at least one non-selected wireless station by:
      generating, in the selected wireless station, a local TSF value;
      comparing the local TSF value with the received TSF value; and
      selectively adjusting the value of N based at least in part on the comparing; and
   the transceiver to contend for access to a wireless medium associated with the ad-hoc wireless network to attempt to broadcast a beacon frame from the selected wireless station only at every $N^{th}$ target beacon transmission time, wherein the value of N is independent of a target beacon transmission time interval.

8. The selected wireless station of claim 7, wherein the processor is to selectively adjust the value of N by:
   decreasing the value of N if the local TSF value is greater than or equal to the received TSF value; and
   increasing the value of N if the local TSF value is less than the received TSF value.

9. The selected wireless station of claim 7, wherein the processor, in selectively adjusting the value of N, is to decrease the value of N if the selected wireless station operates as a forwarding node.

10. The selected wireless station of claim 7, wherein the processor is further to:
    divide a contention window into a number of sub-windows;
    assign the selected wireless station to a random one of the sub-windows; and
    for each target beacon transmission time:
       re-assign the selected wireless station to a last of the sub-windows if the selected wireless station transmits the beacon frame; and
       re-assign the selected wireless station to an adjacent lower sub-window if the selected wireless station does not transmit the beacon frame.

11. A non-transitory computer-readable medium storing instructions that, when executed by a processor of a wireless station associated with an ad-hoc wireless network including a plurality of target beacon transmission times, causes the wireless station to:
   receive a timing synchronization function (TSF) value of another wireless station associated with the ad-hoc wireless network;

dynamically adjust the value of a natural number N that indicates a clock speed of the wireless station relative to a clock speed of the other wireless station by:
    generating, in the wireless station, a local TSF value;
    comparing the local TSF value with the received TSF value; and
    selectively adjusting the value of N based at least in part on the comparing; and
contend for access to a wireless medium associated with the ad-hoc wireless network to attempt to broadcast a beacon frame from the wireless station only at every $N^{th}$ target beacon transmission time wherein the value of N is independent of a target beacon transmission time interval.

12. The non-transitory computer-readable medium of claim 11, wherein execution of the instructions to selectively adjust the value of N causes the wireless station to:
    decrease the value of N if the local TSF value is greater than or equal to the received TSF value; and
    increase the value of N if the local TSF value is less than the received TSF value.

* * * * *